H. A. W. WOOD.
MACHINE FOR FINISHING AND COOLING STEREOTYPE PLATES.
APPLICATION FILED APR. 6, 1906.

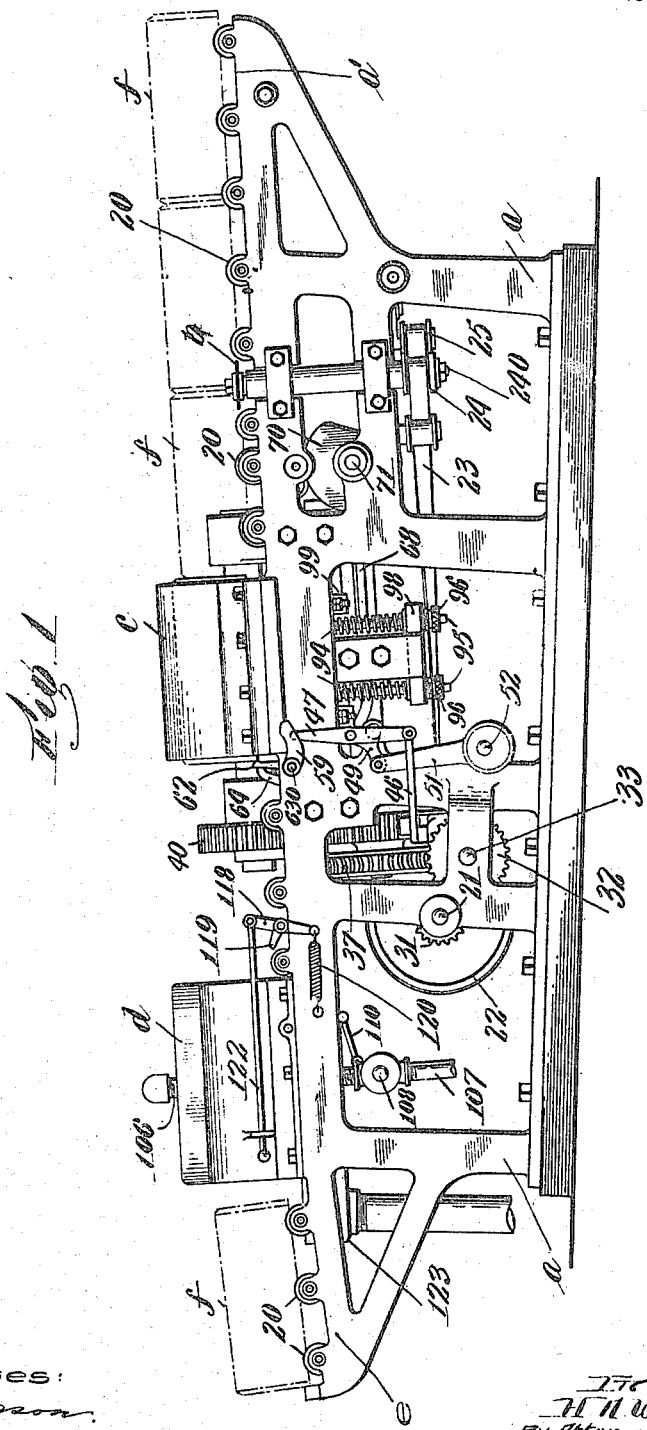

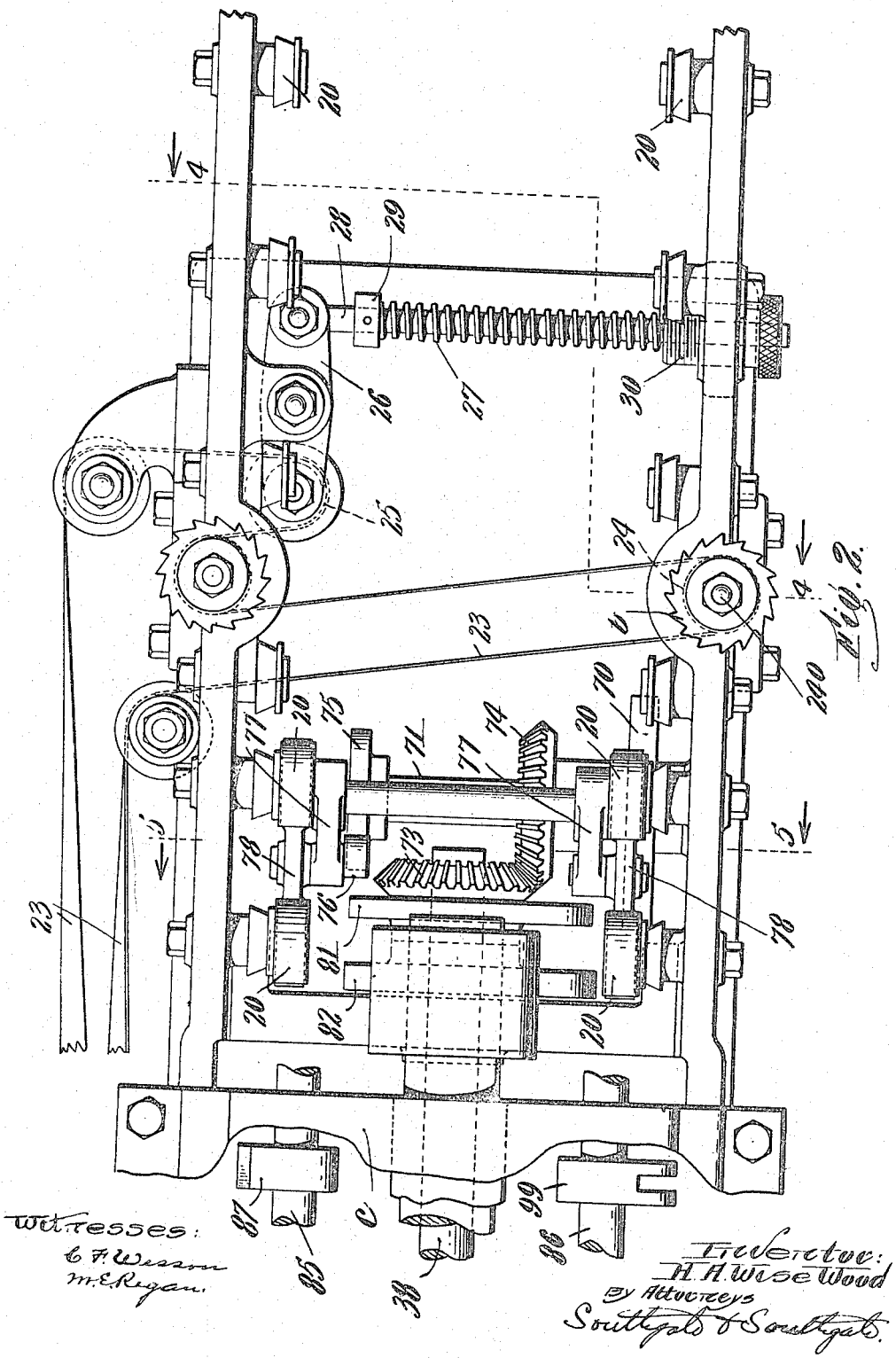

1,269,239.

Patented June 11, 1918.
13 SHEETS—SHEET 3.

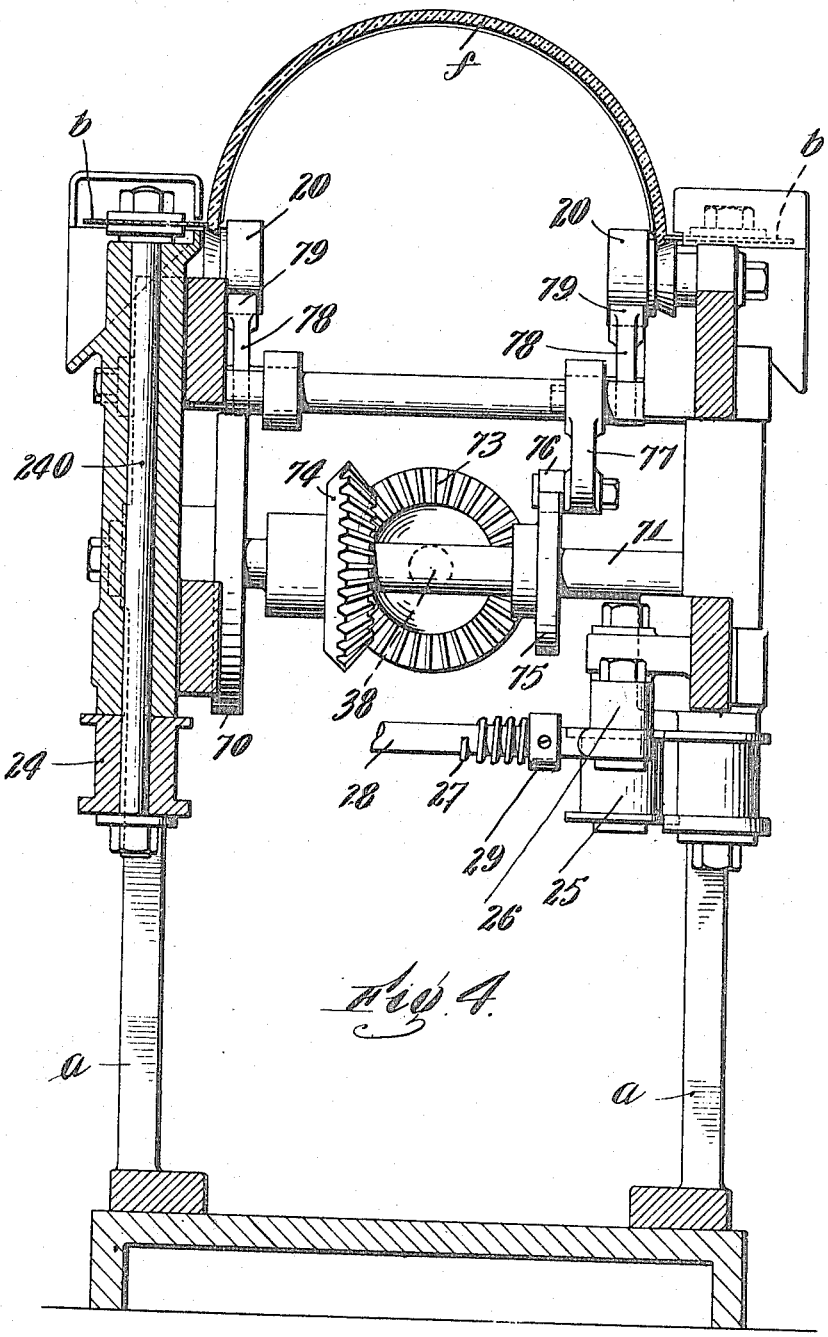

Fig. 5.

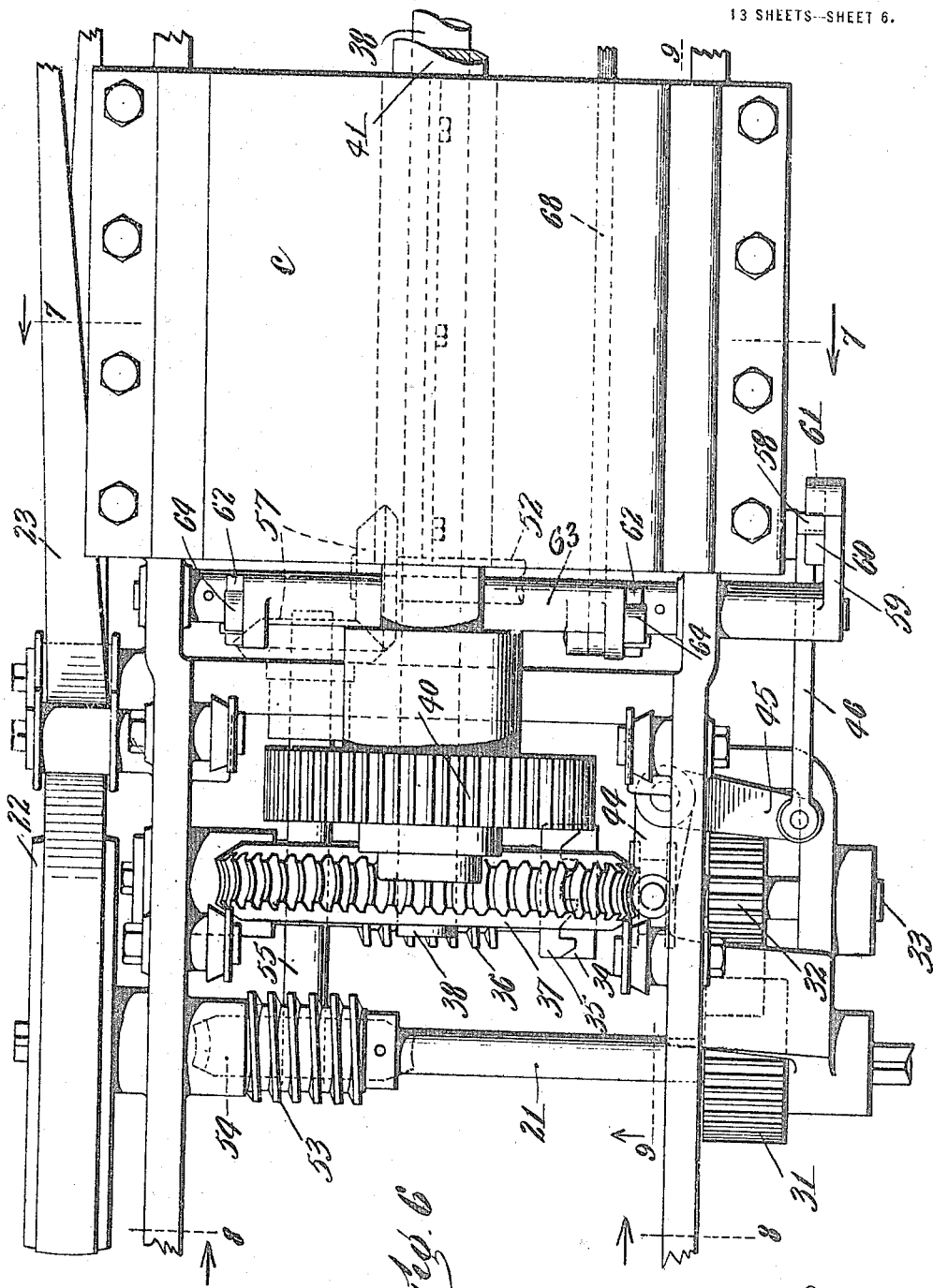

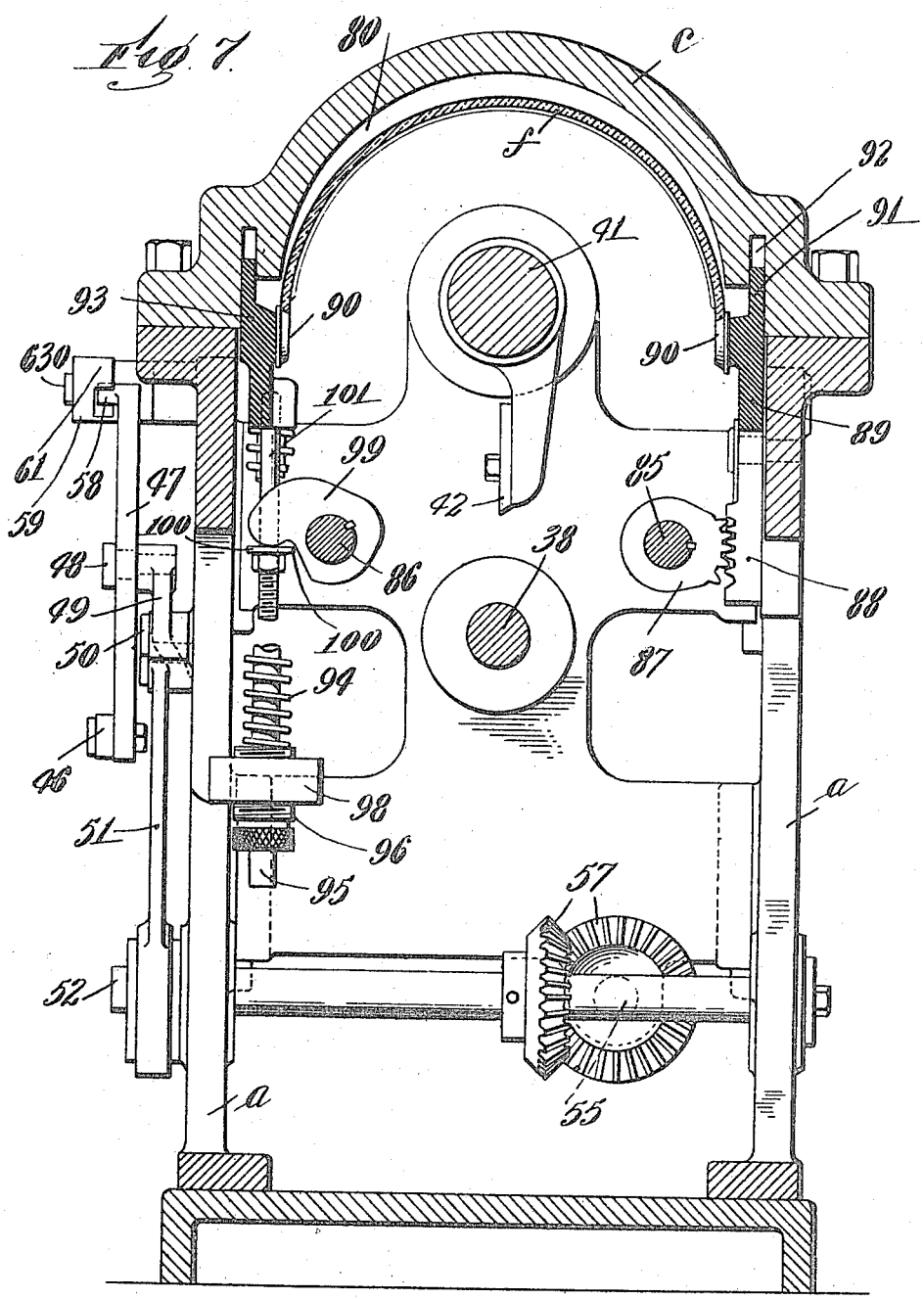

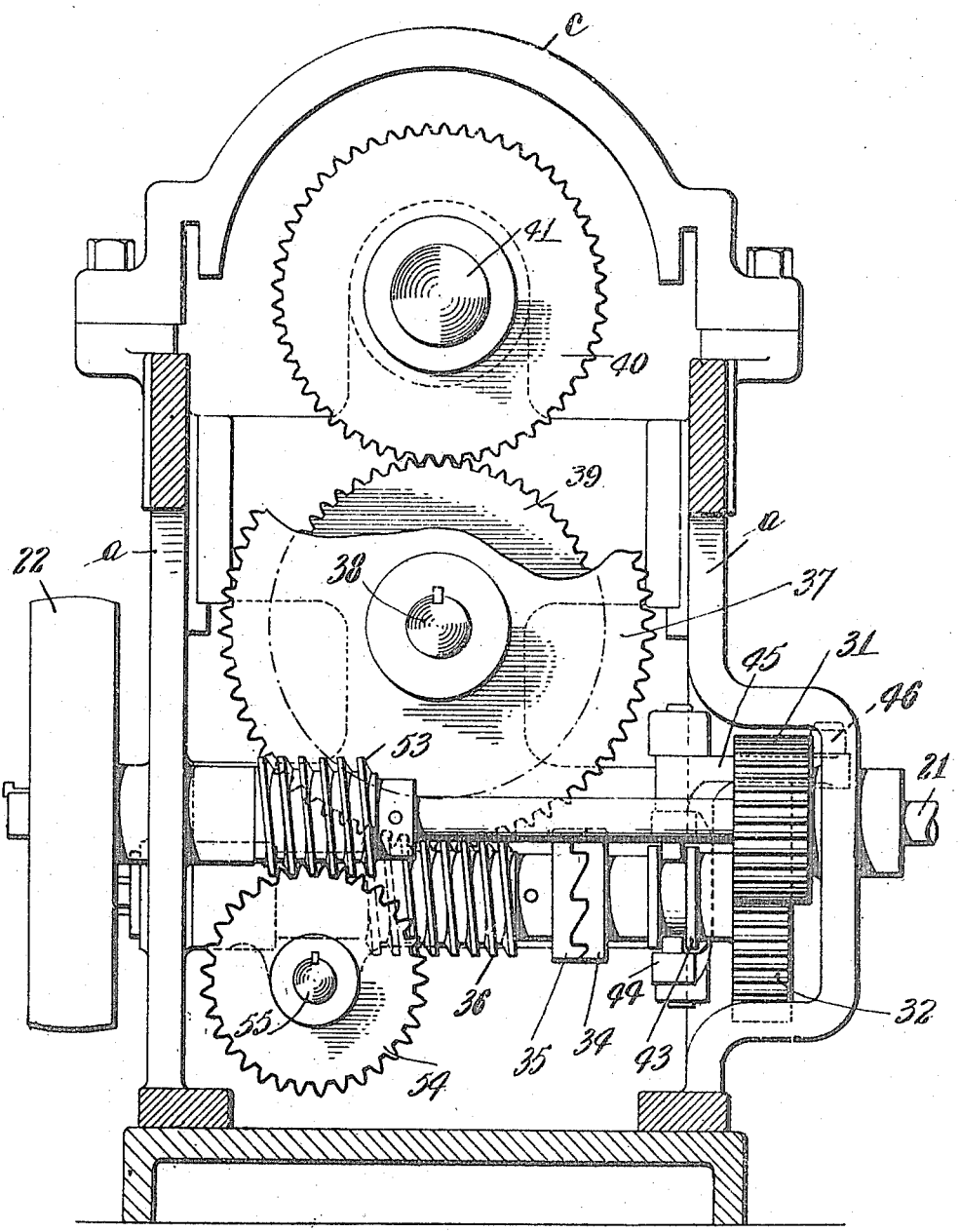

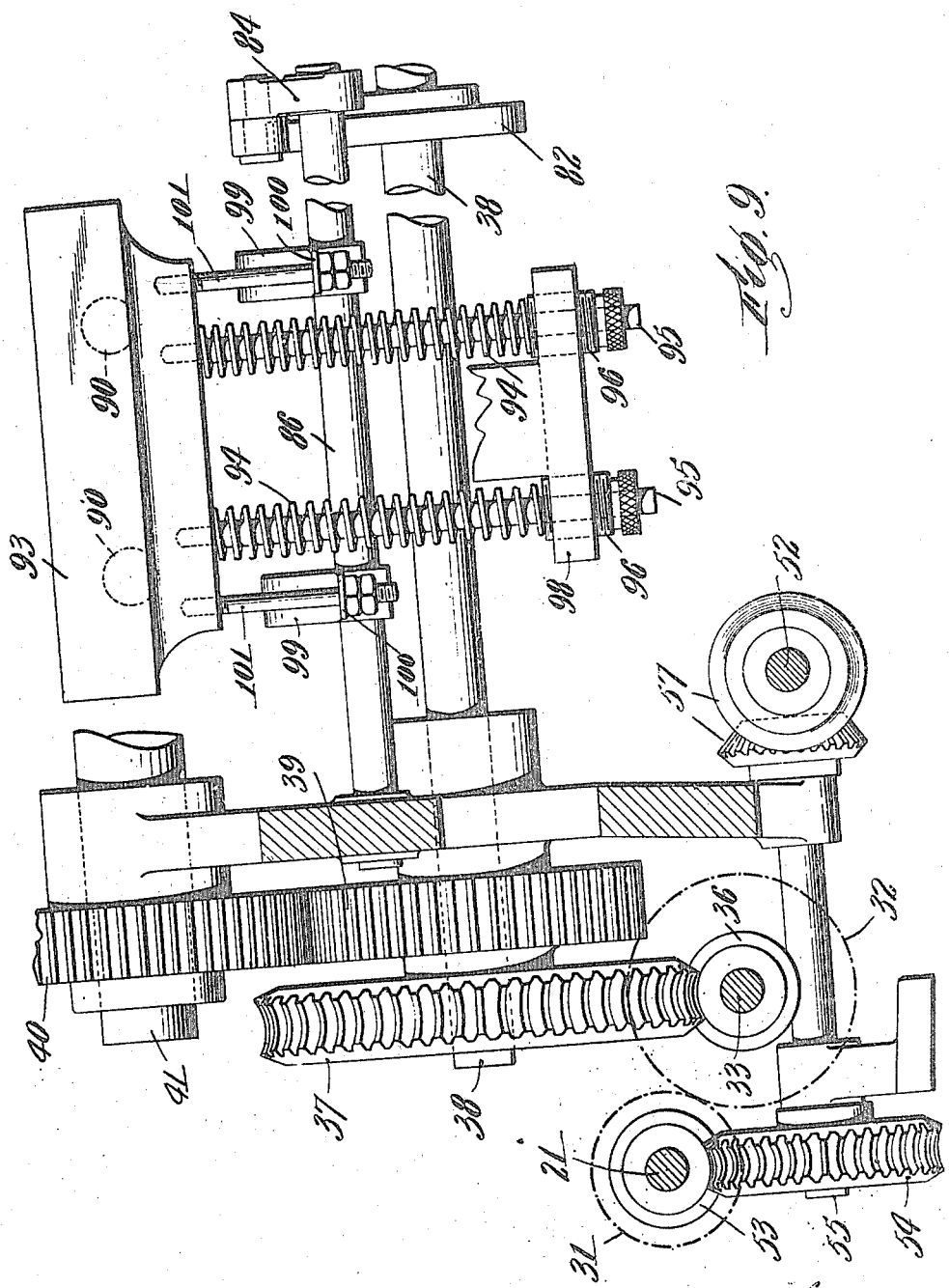

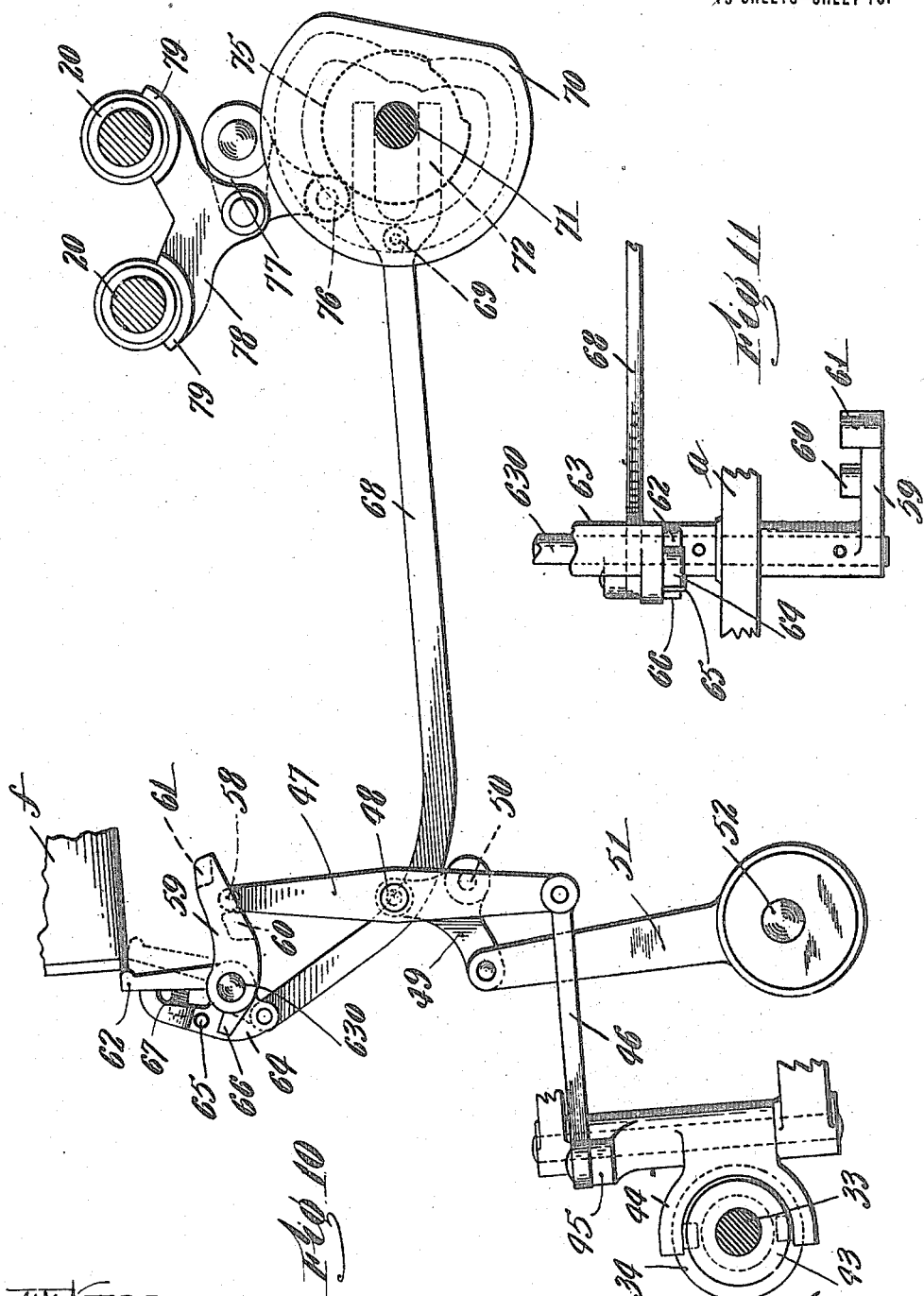

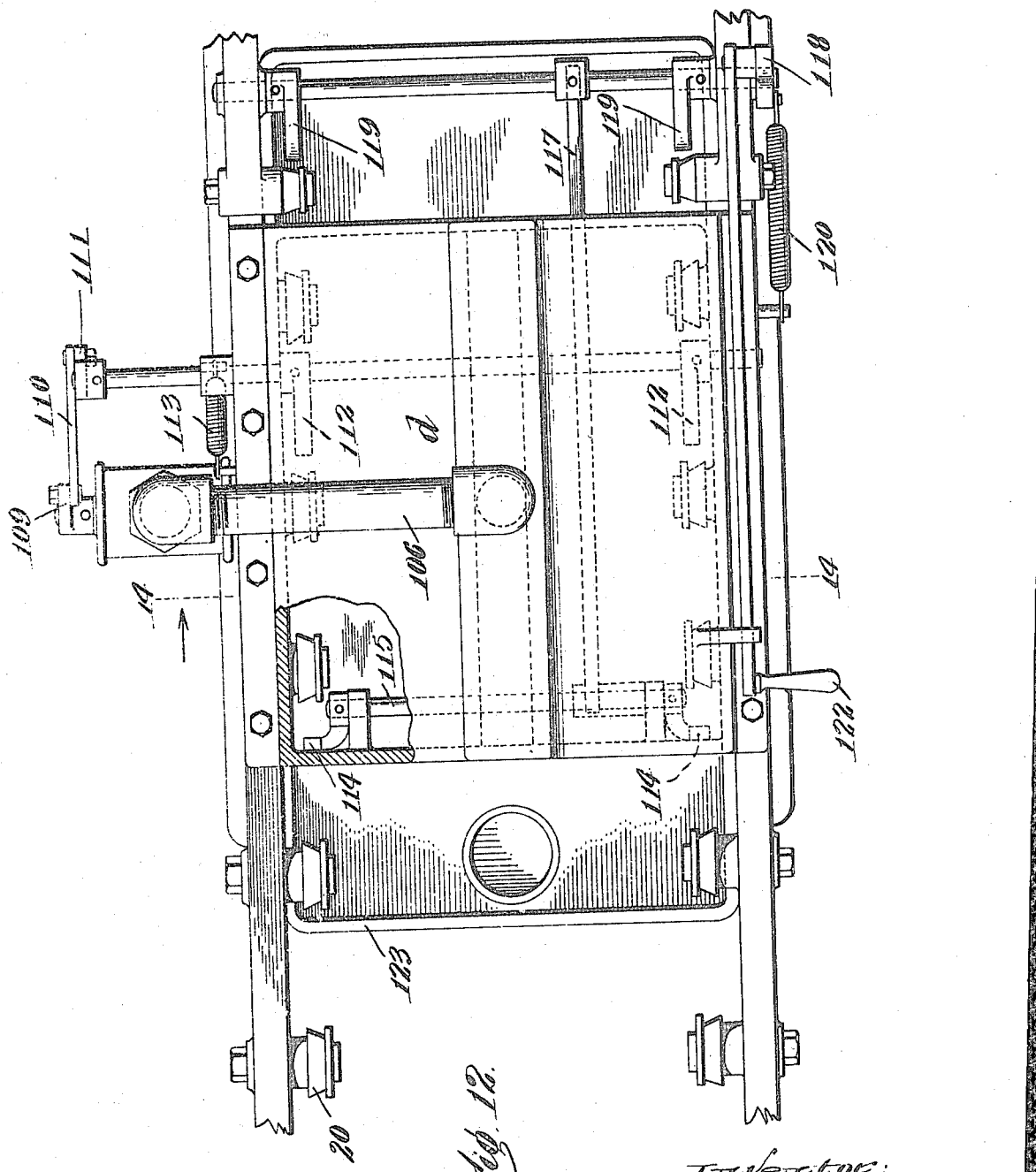

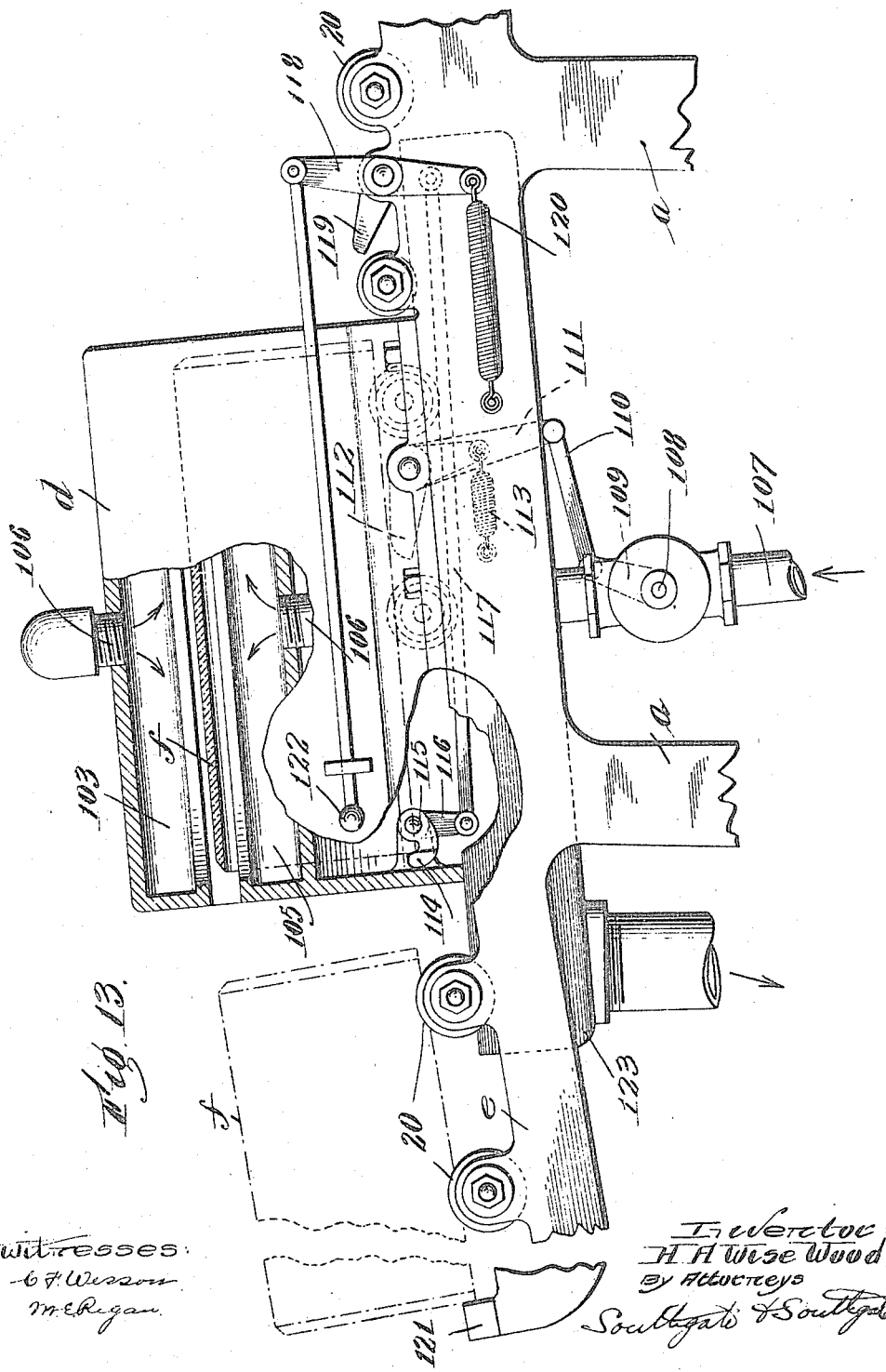

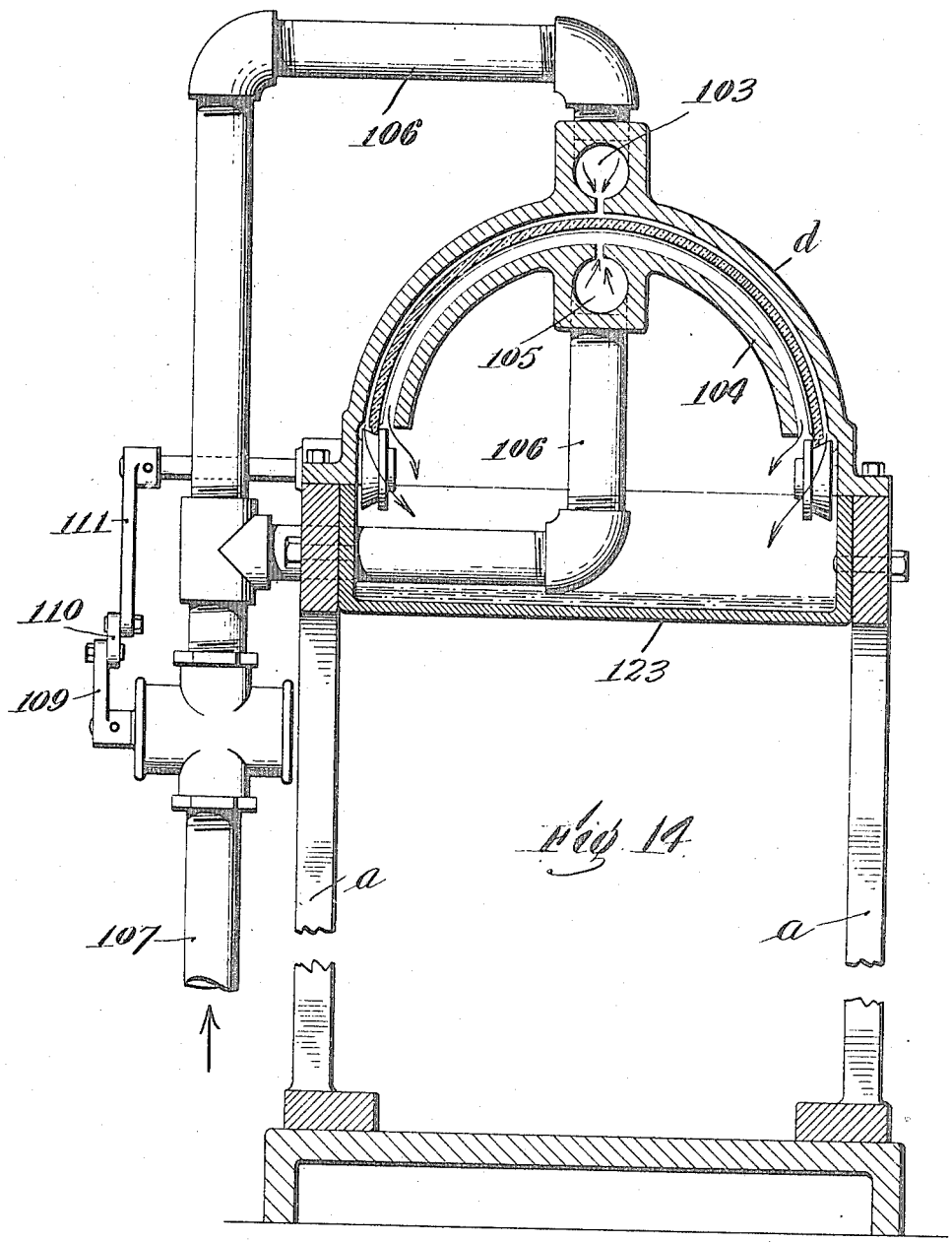

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

MACHINE FOR FINISHING AND COOLING STEREOTYPE-PLATES.

1,269,239.     Specification of Letters Patent.     Patented June 11, 1918.

Application filed April 6, 1906. Serial No. 310,343.

*To all whom it may concern:*

Be it known that I, HENRY A. WISE WOOD, a citizen of the United States, residing at New York, in the county of New York and State of New York, have invented a new and useful Machine for Finishing and Cooling Stereotype-Plates, of which the following is a specification.

Modern newspaper printing is done on what is known as the rotary web press. In this machine the paper, in the form of a continuous web, is printed by being drawn between two printing couples, each of which comprises an impression cylinder and a printing cylinder, one couple printing on one side of the web and the other couple on the other side of the web, the web going through each couple something as a handkerchief goes through the rolls of a wringing-machine. The printing cylinder has attached thereto a number of the so-called stereotype printing plates, each plate corresponding to a page of the newspaper to be printed.

In practice, the stereotype printing plate commercially used is a semi-cylindrical plate made of a metal known as stereotype metal, which is a composition of lead, tin and antimony. The plate is made as follows: The type and cuts which correspond to the reading matter of a newspaper page are set up in a flat form. A soft wet papier-mâché matrix is then beaten on to this flat form of type and dried in contact therewith, thus producing what is known as the matrix. This matrix is then bent into semi-cylindrical form and placed in a casting-box, and a semi-cylindrical casting is made therefrom in hot stereotype metal, forming the rough stereotype plate. This stereotype plate thus will have a replica of the flat form of type on its convex surface. The plate then has to be finished accurately for application to the printing cylinder of the press. By years of experience it has been found that the plate can be best finished while in a hot condition and while it is still plastic and flaccid. This finishing is begun by truing up the two parallel straight edges of the plate. The plate is then put in a cylinder and is rigidly clamped in position so that the convex type face of the plate will be forced and squeezed against the inside of the cylinder to conform to its inside, which is very accurately trued. Then the inside of the plate is trued out exactly cylindrical so that the plate will receive an absolutely cylindrical shape and will fit nicely on the printing cylinder.

The finished plate then has to be cooled and should be cooled in such manner as to preserve accurately the truth of the convex printing surface and the finished edges and back. The plate must be cooled, because if applied hot to the press, the heat of the plate would distort the rolls which ink the plate. Thus, accurate finishing and accurate cooling are necessary to make a stereotype printing plate, and the accuracy demanded can be well understood by remembering that printing surfaces, such as in half-tones, only vary two one-thousandths of an inch from each other in elevation. The thickness of a sheet of newspaper is only three one-thousandths of an inch.

In addition to the factor of accuracy, speed is an essential in the production of stereotype printing plates adapted for use in newspaper offices. The forms of type are kept open until the last moment to get the very last item of news possible, and then after the forms are closed the presses must be started in operation, without an instant's delay. In the ordinary newspaper office a number of presses are employed so that a number of plates must be made from the same matrix. Therefore accuracy and speed are the great factors.

Prior to my invention of the autoplate, as shown in my Patent No. 721,117, dated February 17, 1903, the art of stereotyping was substantially a hand-practised art, that is, while three or four machines were employed, the hot plates were carried to and from these various machines by operators, and, after the finishing, the plates were dipped into a trough or tank so that they would be cooled. This trough or tank dipping was usually accomplished by hand. A finished stereotype plate for the ordinary newspaper page weighs about forty-five pounds, and the labor involved in making stereotype plates can well be understood when it is stated that it often requires 2,600 plates to plate up the presses used in some large newspaper offices to print a Sunday edition. Prior to my invention of the autoplate, the art of stereotyping was the weak link in newspaper production. Machines, such as the linotypes, had been invented for rapidly setting up the forms of type, and the rotary web press had been brought to a high state of perfection, but the intermediate and necessary process of stereotyping was necessarily a hand-practised art. The autoplate completely revolutionized the art. It was the first machine by which stereotype printing plates were cast and finished automatically. It was a machine by which four of such plates could be finished per minute without any manual manipulation.

But the autoplate was not a complete machine. As will be seen by reference to Fig. 2 of Patent No. 721,117, the hot finished plates were deposited on a delivery stand $H^2$. From this stand, workmen took the hot plates and dipped them into a tank to cool them, so that they could be then put on an elevator and carried up to the press room. This, of course, was a laborious operation and was objectionable, particularly because when the workman handled the hot plate, he was apt to distort the same as it was still mushy and he might not evenly plunge the same into the tank of water, leading to what is known as a "shrink," or sprung plate which would print unevenly.

The purpose of the invention here disclosed is to obviate this defect and rapidly cool the plates after finishing in such manner as to preserve the truth of the finished plates.

The following is a general description of the invention. The stereotype printing plates, while at a high temperature and still very soft or flaccid, are removed from the casting machine. They are then placed upon the receiving end of the machine, the lower edges of each plate resting upon a series of parallel rollers forming a runway and inclined at such an angle that each plate will move by gravity to its successive positions. These rollers are designed to support the plates during their travel by their straight edges. The anti-friction rollers nearest the finishing arch are controlled by brakes, which are automatically released, so that the forward plate will run into this arch. As each plate moves from the receiving end of the machine into the arch, its straight edges are smoothed off or trimmed by cutters, these two finished straight edges thereafter forming supporting points for the plate. As the plate runs into the finishing arch, it engages two stops, which engagement automatically sets the finishing mechanism into operation. While in the finishing arch, the plate is supported on anti-friction rollers. The first operation is for the brackets supporting these rollers to move upwardly to clamp the plate against the smooth inside face of the arch or cylinder, thus imparting an exact semi-cylindrical shape to the plate. While clamped in this position a knife revolves and trims off the inner concave side of the plate, thus producing an almost mathematically true semicylinder.

The forcible clamping of the soft plate against the inside of the arch while the shaving knife acts, gives the plate its exact shape and thickness. The action of the knife, which has a dulled edge, forces the soft plate to conform to the curvature of the arch and gives the plate its exact shape and thickness. This completes the accurate finishing of the plate, which however, is still in hot flaccid condition and extremely sensitive to distortion.

The rollers then move down and the stops are withdrawn out of the way, and the plate runs forward on anti-friction rollers into a spraying arch. As the plate runs into this spraying arch, it engages a lever which automatically opens a valve in the supply pipe so that a spray or sheet of water will be applied to both sides of the plate. When this application of the spray is made, the plate is accurately supported on its straight edges on the anti-friction rollers, and this even application of the spray throughout the entire surface of the plate, while it is being held in an undistorted condition, will exactly and correctly cool it, so that the truth of the finished plate will be preserved.

By these joint or coördinated operations, when the plate is taken from the machine at the delivery end of the machine it is finished and accurately cooled to correct shape and is ready for application to the printing cylinder of the rotary press. From this description it will be seen that the entire operation of finishing and cooling the plate is performed automatically with no attention from the operators other than the supply and removal of the plates. The truth of the finished plate, both as to thickness and cylindrical conformation, is carefully and accurately established and preserved. The cooling mechanism by which the spray is applied is accurately built so that the plate will be held on its straight edges and so that the spray will be evenly applied to the entire surface of the plate. The machine is automatic in operation and requires no attention from the operators, and the inevitable distortion of the plate which is incident to the constantly changed conditions caused by hand regulation is eliminated.

Reference is to be had to the accompanying thirteen sheets of drawings in which, Figure 1 is a side elevation of a machine constructed in accordance with the principles of my invention.

Fig. 2 is a plan of a portion thereof on an enlarged scale.

Fig. 3 is an enlarged side elevation of parts shown in Fig. 1.

Fig. 4 is a sectional view on the line 4—4 of Fig. 2.

Fig. 5 is a sectional view on the line 5—5 of Fig. 2, showing the parts at a different point in the cycle of operation.

Fig. 6 is a plan of a portion of the machine.

Fig. 7 is a sectional view on the line 7—7 of Fig. 6, showing the parts in the same position as in Fig. 5.

Fig. 8 is a sectional view on the line 8—8 of Fig. 6.

Fig. 9 is a sectional view on the line 9—9 of Fig. 6, with the arch of the machine removed.

Fig. 10 is a side elevation of the mechanism for controlling the stopping and starting of the machine, parts being shown in section.

Fig. 11 is a plan of certain features illustrated in Fig. 10.

Fig. 12 is a plan of another portion of the machine, parts being shown in section.

Fig. 13 is a side elevation of the portion of the machine illustrated in Fig. 12 parts appearing in section, and Fig. 14 is a sectional view on the line 14—14 of Fig. 12.

For an idea of the general nature of the invention, reference is to be had to Fig. 1 which shows a frame $a$ provided with an inclined bed or run-way $a'$, for carrying stereotype plates.

The machine is intended to be used chiefly in conjunction with a plurality of stereotype printing plate casting boxes, the product of which is placed by hand or otherwise on the upper end or saddle of the run-way or support $a'$. These plates then move by gravity down the run-way to finishing mechanism by which their edges are first finished by cutters $b$, then they enter another part $c$ of the finishing mechanism in which their interior surfaces are shaved or dressed. From this point they pass to a cooler $d$ and from that they move out onto a table $e$ from which they are then removed by hand or otherwise.

It is to be observed that on account of the incline of the run-way and on account of the fact that it is provided with anti-friction devices shown as in the form of a series of rollers 20, no positive feeding mechanism and no driving device for feeding the plates or other blanks is necessary. The incline of the bed is such that the plates are readily fed down by gravity when they rest freely on the rollers and if the rollers are held in stationary position and prevented from rotating, the plates are held and do not slide along the stationary surfaces of the rollers.

By finishing the plates as they are taken direct from the casting machines before they are cooled off, they are operated on by the finishing tools while in a comparatively soft state, and while held rigidly in the shaving arch. Then by taking them directly to the cooler, without handling or changing their direction of motion, and cooling them while their weight rests on true surfaces, practically all chance of distortion and defacement is eliminated. When the finished plates are handled before cooling they are likely to become distorted or defaced by the handling. During the ordinary hand cooling process the plates are free to warp and twist out of shape owing to the uneven strains put upon them. By my procedure these difficulties are avoided.

The saving in time and expense resulting from the alinement of the finishing and cooling mechanisms as specified in several of the clams is also important. It is well understood that the time required for producing a printing plate and getting it ready for printing is a very important matter in modern newspaper plants. These papers, being produced every day, and often in several editions a day, have to be pushed through with great rapidity, and the stereotyping is a part of the operation which usually limits the production of any particular plant, and seriously interferes with the rapid production of the newspapers. The result is that newspaper plants are obliged to have more stereotyping facilities than would otherwise be necessary in proportion to the capacity of their printing plant. This is very expensive and wasteful of room, and in many cases publishers do not see their way clear to provide sufficient stereotyping facilities.

Power is applied to the machine for operating the several parts thereof through a main shaft 21, this shaft being provided with a pulley, gear, or the like, for receiving power from any desired source.

For the purpose of driving the trimming cutters, one of which is located on each side of the machine, I have shown a pulley 22 driven by the main shaft and provided with a belt 23 passing around pulleys 24 on spindles 240 which support the cutters $b$. For the purpose of maintaining the belt or other driving connection in a taut condition, a tightening pulley 25 is mounted in engagement with the belt on a lever 26. This lever is normally forced into a position such that this pulley will keep the belt tight by means of a spring 27 mounted on a guide rod 28 connected with the lever and provided with a collar 29 on which the spring bears. The tension of the spring can be adjusted by a threaded bushing 30.

It will be noted that the same belt passes from one side of the machine to the other and operates both cutters.

For the purpose of operating the part c of the finishing mechanism, I have mounted on the shaft 21 a wide-faced gear 31 meshing with a sliding gear 32 on a shaft 33. The gear 32 is rigidly connected with a clutch member 34 adapted to engage a clutch member 35 which is rigidly connected with a worm 36 rotatably mounted on the shaft 33. This worm operates a worm-wheel 37 on a shaft 38, the worm-wheel being rigidly connected with a gear 39 for operating a gear 40 on a shaft 41 which carries a shaving blade 42. The operation of the shaving blade is obviously controlled by the position of the gear 32 and clutch member 34.

For the purpose of operating these elements to connect the shaving knife with the source of power and disconnect it therefrom, I have provided a collar 43 with which engages a yoke 44. This yoke is designed to be operated by a lever 45 which is connected by a link 46 shown in Fig. 10, with a lever 47. This lever is pivotally mounted on a stud 48 carried by a rocking lever 49 which is pivoted on a stationary stud 50 on the frame of the machine. With the opposite arm of this lever is connected an eccentric arm 51 mounted on a shaft 52 for the purpose of rocking the lever 49. In order to operate the shaft 52, the main shaft 21 is provided with a worm 53 driving a worm-wheel 54 and a shaft 55. The shaft 55 drives the traverse shaft 52 by means of miter gears 57.

It will be seen that the eccentric arm 51 constantly rocks the lever 49 back and forth and as the lower end of the lever 47 is connected with the rod 46, that end will ordinarily constitute the fulcrum of the lever and the upper end will vibrate idly. If, however, the upper end is arrested in its motion, the movement of the lever will take place from the upper end as the center and the lever 45 will be manipulated in one direction or the other, according to the side upon which the obstruction is applied to the lever 47.

For the purpose of controlling this matter, I have provided the lever 47 with a pin 58 and on a pivoted arm 59 I have mounted a pair of lugs 60 and 61. These lugs are located out of alinement with each other, the same being in such position that when the arm 59 is in the position shown in Fig. 10, the pin 58 will engage the lug 60 and motion will be transmitted to the clutch in such a way as to connect the clutch members and start the shaving knife. When, however, the arm 59 is turned downwardly, the pin 58 can pass over the lug 60 and in its motion in the other direction, it will engage the lug 61. The mechanism is thereby so operated by the eccentric arm 51 as to uncouple the clutch members and stop the shaving mechanism. I have so designed the machine that the motion of the plates causes these manipulations to take place.

Fig. 10 indicates a plate f in the position which it assumes when it has passed into the shaver c and reached the end thereof. At this time it engages a movable stop, shown in the form of a pair of fingers, 62 and moves it from the dotted to the full line position, which raises the arm 59 with which the stops are rigidly connected. The stops and arm are secured to a shaft 630.

In order to provide for moving the stops to the left when the shaving operation is completed and allowing the plate to pass out of the finishing mechanism, I have pivotally mounted on the shaft 630 levers 64 connected by a sleeve 63. These levers are each provided with a pin 65 adapted to engage a lug 66 on one of the stops 62. By moving the levers 64 backwardly on their pivots, it will be seen that the pins 65 will operate the stops to move them to the left and permit the plate to pass. I have shown the levers 64 as having arms engaging the rear surfaces of the stops and also as being provided with springs 67 for forcing the stops to the front when the arms are in engagement with the stops to hold the stops in the dotted position.

For the purpose of manipulating the levers, I have connected the lower arms or one of them by means of a link 68 with a cam-roll 69 operated by a grooved cam 70. This cam is mounted on a shaft 71 which is engaged by a fork 72 on the rod 68, to keep the link in place. The shaft 71 is operated by a miter gear 73 on the shaft 38, meshing with a miter gear 74 on the shaft 71.

On the shaft 71 is also mounted a cam 75 operating a cam-roll 76 mounted on a rocking lever 77 which carries a frame 78 bearing one or more brakes 79 for the rollers 20 which are located nearest to the shaving mechanism. It will be seen, therefore, that starting with the mechanism at rest, the incoming plate striking the stops 62 moves the latter and places the lug 60 in position to limit the motion of the pin 58 in one direction, thus causing the lever 47 to so operate as to throw in the clutch and start this mechanism into operation.

After the shaving action is completed, the cam 75 acts to apply the brakes to the rollers nearest the shaving mechanism so as to hold the next plate while the plate which is in the shaver is delivered therefrom. The stops 62 are then turned back to the left by the operation of the cam 70 as described, to allow the plate to run out of the shaver. The stops are next returned to the position shown in dotted lines and the brakes are released from the rollers to allow the next plate to pass into the shaving part of the mechanism, the clutch is automatically thrown out and the shaving knife having completed one cycle stops in its normal position.

Figure 5:
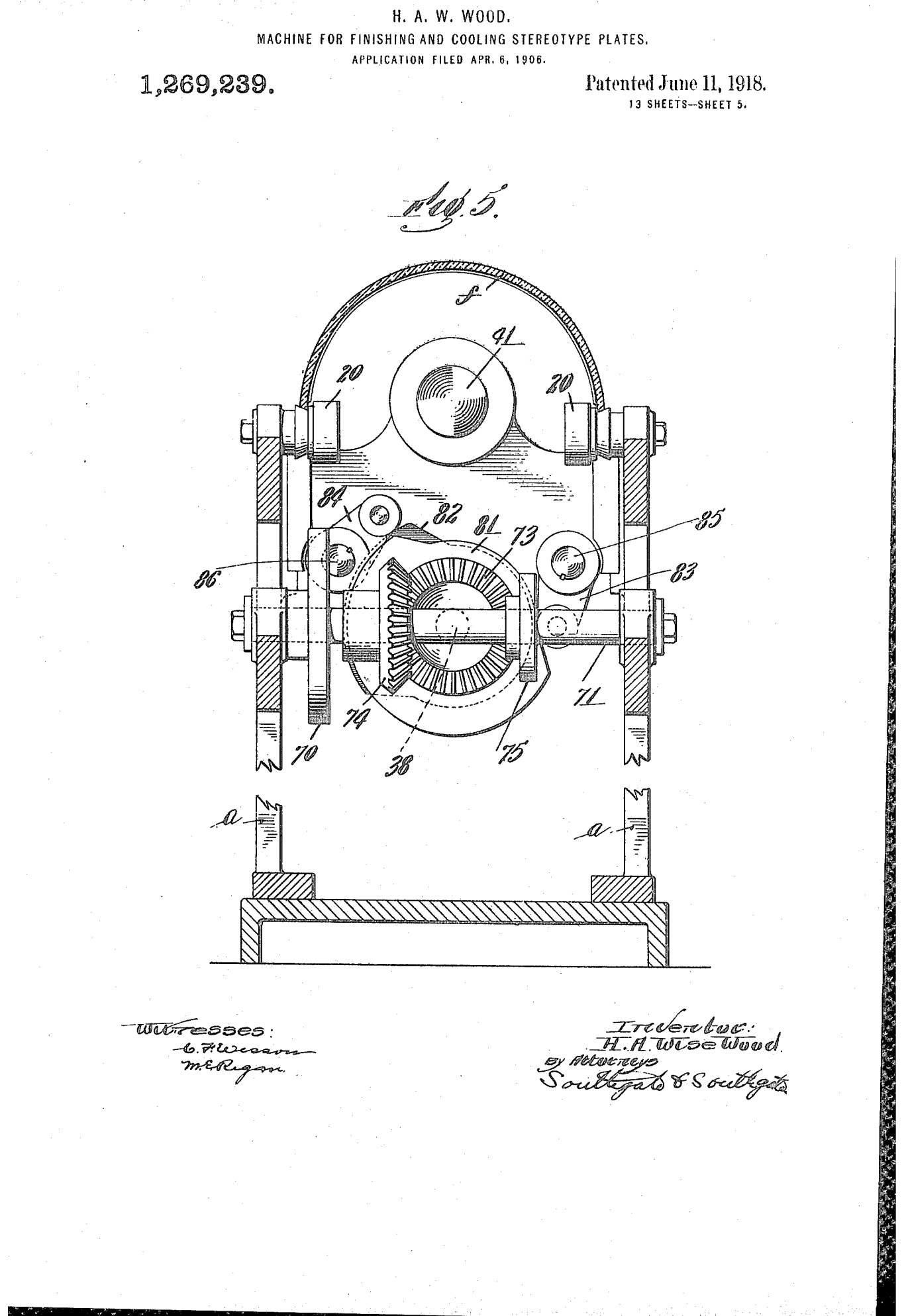

It will be observed by reference to Figs. 4, 5 and 7, that this part of the finishing device is shown in the form of a frame having a cavity 80. In this case, the cavity is cylindrical and the frame is in the form of an arch. For the purpose of forcing the plate to be finished into this arch and seating it securely in position for the finishing operation of the shaver, I have provided the following mechanism:

On the shaft 38 are mounted two cams 81 and 82. One of these cams operates a roller arm 83 and the other a roller arm 84, these arms being located on shafts 85 and 86, respectively. On the shaft 85, as shown in Fig. 7, is a gear segment 87 meshing with a rack 88 which slides toward and from the arch and carries a clamp 89. On this clamp is mounted a roller 90 for supporting one edge of the plate. The clamp is provided with a projection 91 working in a guide 92. It will be seen that this structure affords means for positively forcing the clamp toward the arch and carrying the plate with it to a seat therein. On the opposite side of the frame, on which the plate is carried through the shaving mechanism, is a corresponding clamp 93 constructed in the same manner as the clamp 89 and sliding toward and from the arch. This clamp, however, is not positively forced upward but is given a yielding thrust in that direction by means of springs 94 mounted on guide rods 95 which are adjustably connected by means of bushings 96 with a projection 98 on the frame. In order to normally depress the clamp 93 and prevent the springs from forcing it up when a plate is not in position, I have mounted a pair of forked arms 99 on the shaft 86. These arms normally press on plates 100 mounted on rods 101 which carry the frame 93. In operation, these parts are actuated when the plate engages the stops 62 and starts the shaft which operates the two shafts 85 and 86. The first motion of these parts is the upward motion of the rack 88 and then the withdrawal of the forked arms 99 from the plates 100 allowing the springs to force the clamp 93 upward while the gear segment positively forces the clamp 89 upward. It will be observed that if there is any irregularity in the length of the plates which are supplied to the machine, this will be accommodated by the yielding connections described. It will, of course, be understood that the clamping operation is completed and the plate securely seated in the arch before the shaving blade begins to cut into the plate and that the clamps recede, one operating by the return motion of the segment 87 and the other by the depression of the forked arms 99 against the plates 100, immediately after the shaver completes the operating part of its stroke. It is at this point that the brakes are applied to the rollers.

When the plate is released from the shaver it runs out on the rollers below it and into the cooler $d$. This cooler is in the form of a shell having a chamber for receiving the plates or other articles to be operated upon. The outside of the shell is provided with a passage 103 having a plurality of openings for introducing water or other cooling fluid upon the outside of the plate. Inside the chamber is also located a plate 104 having a similar passage 105 for providing for cooling the inside of the stereotype plate. Both these passages are connected by pipes 106 with a supply pipe 107 having a valve or cock 108. With this cock is connected an arm 109, link 110 and a lever 111. This lever is pivoted on the frame and is provided with arms or dogs 112 located normally in the path of the end of a plate entering the cooler. When the plate passes along the rollers and engages these dogs, it moves the lever in opposition to the force of a spring 113 which normally holds the valve 108 closed and opens the valve so as to permit the cooling fluid to enter both cavities and cool both sides of the plate. It is desirable to leave the plate in the cooler as long a time as is necessary for the finishing of a plate in the shaver, consequently I have provided movable stops 114, mounted on a shaft 115. An arm 116 is provided for swinging the stops and this arm is connected by a link 117 with a lever 118.

This lever is pivotally mounted on the frame and is provided with dogs 119 projecting into the path of an in-coming plate. A spring 120 normally holds these parts in the position shown in Fig. 13. When the dogs 119 are depressed by a plate resting on them, the stops 114 are also depressed, the lever 118 moving in opposition to the spring 120, and the plate in the cooler slides out onto the receiver $e$ against a stationary stop 121. It will be seen, therefore, that each plate remains in the cooler until another plate is finished and delivered into a position to enter the cooler. If the operator desired to allow a plate to leave the cooler before another plate is delivered to it, or if no more plates are to be delivered, he can manipulate the lever 118 by a hand-operated slide 122.

The water or other cooling fluid applied to the plates is collected in a receptacle 123 and may be discharged in any desired way.

While I have illustrated and described a particular form of my invention in which curved stereotype plates are operated upon, it is to be understood that the invention is capable of employment for treating other forms of articles and that many modifications may be made by a person skilled in the art without departing from the scope of my invention as expressed in the claims.

The complete operation of the mechanism is clear from the foregoing specific description and briefly is as follows:—

A semi-cylindrical stereotype printing plate is taken from the casting mechanism and is placed on the rollers 20 at the receiving end a' of the machine. The plate may be as hot as it is possible to place the same in position. The plate then moves on the rollers 20 until it comes in engagement with the rollers 20 nearest the finishing mechanism c, which are controlled by the brakes 79. As the plate moves on the rollers 20, the same passes the cutters b—b and the straight edges of the plate are cut or trimmed off so as to be perfectly true. If there is no plate in the finishing mechanism, or at the proper time in the cycle of operation, the brakes 79 are released from the rollers 20 nearest the finishing mechanism and the plate continues its onward movement into the finishing mechanism until it strikes the dogs or stops 62 and turns the lug 60 into the position shown in Fig. 10. As the shaft 52 is turning continuously, at the proper point in the cycle of operation, the clutch 34 will be thrown to engage the clutch 35, which will set the shafts 38, 41 and 71 into rotation. The mechanisms operated by these shafts then will lock the brakes 79 so that the next succeeding plate cannot enter the arch, will lock the first plate in the arch, and will hold the same in clamped position in the arch while the shaver trims and smooths out the interior of the plate.

As soon as this operation is completed, the clamps will release and lower the plate and the dogs 62 will be moved to allow the plate to continue its forward run. The brakes 79 will be released. The gearing is so arranged that the shafts 38, 41 and 71 make one complete revolution for each cycle of operation. Therefore, it will be noticed that the mechanism controlled by these three shafts only is called into operation when there is a plate in the arch to be finished. If there is another plate following the first plate, the same will move into the arch after the first plate moves out of the same, whereby the shafts 38, 41, and 71 will be again put into operation.

As the first plate moves forward from the arch, it moves into the cooling mechanism and as it passes into the cooling mechanism it turns on the water so that the plate will be sprayed with water and cooled. The plate remains in the cooler, unless released by the operation of the handle 122, until the next succeeding plate engages the dogs 119 and moves the dogs 114 out of position to hold the first plate, when the first plate will move forward from the cooler on the rollers 20 of the receiver e and engage the stop 21. By spraying the surfaces of the curved plate with water, any chips or dust clinging to the same from the finishing operation will be washed off.

By arranging the mechanism so that the semi-cylindrical plates will pass directly from the finishing mechanism to the cooling mechanism without intermediate manual manipulation, a most desirable result is obtained. The plates can be put into the finishing mechanism very shortly after they are cast, in a hot or plastic condition. As the plate passes into the finishing mechanism it is trued along its straight edges, then it is clamped by said finished straight edges and is finished while clamped by these straight edges. Then it passes from the finishing mechanism to the cooling mechanism by being guided on said straight edges on which it was clamped for the final finishing operation, and the cooling mechanism sets and hardens the plate so that it will retain and set in the exact shape it was brought to by the finishing mechanism. These important results are obtained in particular by causing the plate to pass directly, without manual manipulation, from the finishing mechanism to the cooling mechanism by causing it to travel in this path while supported on its finished straight edges.

The cooling mechanism herein shown and described is claimed in a divisional application filed by me April 23, 1910, Serial No. 557,106, in pursuance of a Patent Office requirement, and refiled August 31, 1915, Serial No. 46,560½, and renewed November 24, 1917, No. 203,859.

Having thus fully described my invention, what I claim and desire to secure by Letters-Patent is:—

1. In a stereotype plate finishing machine, the combination of means for first finishing the plate, means for thereafter applying a cooling fluid to the plate, and a support arranged so that the plate will be directed from the finishing means to a position where it may be acted upon by the cooling means and the truth of the finished plate preserved.

2. In a stereotype plate finishing machine, the combination of a runway or guide along which semi-cylindrical plates can be guided on their straight edges, a finishing mechanism, and a cooling mechanism arranged so that the plates will be guided by their straight edges through the finishing mechanism on and through the cooling mechanism.

3. In a stereotype plate finishing machine, the combination with a finishing device having means for freely supporting a plate therein after it is finished, and a series of rollers arranged in alinement with said supporting means for receiving plates therefrom, of a cooling arch located over said rollers and adapted to cool the plate as it passes along the same.

4. In a stereotype printing plate treating machine, the combination of means for first finishing plates while hot, with means for cooling the plates after they have been finished without handling or removing them from the machine.

5. In a stereotype printing plate finishing machine, the combination of means for finishing a semi-cylindrical printing plate while hot and in a soft condition, means for supporting the plate on its straight edges on a sufficiently large number of points to preserve its accuracy, means arranged so that while so supported it will move to a cooling position, and means for supplying a sufficient amount of cooling fluid while so supported as to harden the plate before it is removed from its supports.

6. In a stereotype plate finishing mechanism, the combination of an inclined guideway along which a stereotype printing plate can run, saws or cutters for truing the straight edges of the plate as it passes down the incline guideway, a clamping mechanism, a shaving mechanism whereby the plate will be clamped and shaved on its concave surface, means for controlling the entrance of the plate into the clamping and shaving mechanism, and means for controlling the exit of a plate from said clamping and shaving mechanism.

7. In a stereotype plate finishing machine, the combination of an inclined guide-way along which a semi-cylindrical stereotype printing plate can run on its straight edges, cutters for truing the straight edges of the plate, means for shaving the concave surfaces of the plate, means for applying a cooling liquid to the surface of the finished plate, and controlling means whereby the plates will pass in succession down the inclined runway for these operations.

8. In a stereotype plate finishing machine, the combination of a frame having an inclined runway thereon, a finishing device supported on the frame to which the runway leads, and means for stopping the plates in the finishing mechanism while the same acts, which means is released to allow the plates to continue their forward run after being finished.

9. In a stereotype plate finishing machine, the combination of finishing means, and a run-way leading thereto, said run-way having anti-friction devices for supporting stereotype plates and directing them to the finishing means, the run-way also being inclined at such an angle as to feed the plates by gravity when they rest freely on the anti-friction devices and hold the plates in stationary position when resting on stationary surfaces.

10. The combination of a finishing means, an inclined run-way leading to the finishing means, freely rotatable rollers located in said run-way for supporting articles to be finished, and means for arresting the rotation of certain of said rollers.

11. In a plate finishing machine, the combination of an arch for receiving the plates, supports for the opposite edges of the plates, means for positively forcing one of said supports toward the arch, means for yieldingly forcing the other support toward the arch, and a shaft having connections for operating both of said means.

12. The combination of means for finishing casts, a movable stop located adjacent to said finishing means and adapted to be engaged by a cast, a freely rotatable roller located near the receiving end of the finishing means for feeding the casts into the finishing means, a brake for said roller, and means for applying said brake.

13. The combination of a finishing means, a stop located near the discharge end of said finishing means, an operating shaft, means controlled by said stop for starting and stopping said shaft, a cam, means connected with said shaft for operating the cam, a freely rotatable roller for feeding unfinished articles to the finishing means, and a brake operable by said cam for stopping the roller.

14. The combination of means for finishing casts, an inclined run-way leading to the finishing means and adapted to feed casts thereto by gravity, means for stopping a cast while a preceding cast moves out of the finishing means, and means connected with said stopping means for starting the finishing means into operation.

15. In a stereotype plate finishing machine, the combination of a plate shaver, means for guiding plates thereto, a movable stop, and means controlled by said stop for starting the finishing means when a plate is moved into engagement with said stop.

16. In a stereotype plate finishing machine, the combination of a plate shaver, a movable stop, a shaft adapted to operate the plate shaver, a clutch connected with said shaft for connecting it with, and disconnecting it from, a source of power, a lever for operating said clutch, and means connected with said stop for controlling the operation of said lever.

17. In a stereotype plate finishing machine, the combination of a plate shaver, a movable stop located adjacent to said shaver in the path of the stereotype plates, an arm connected with said stop, said arm having two lugs thereon spaced apart and located in different planes, a lever having a pin adapted to engage said lugs, means for supporting said lever at a point between its ends, means for oscillating the supporting means, and a clutch connected with said lever and adapted to be operated thereby when said pin is in engagement with either of said lugs.

18. In a machine for finishing stereotype printing plates, the combination with a frame and a support thereon for receiving the plates to be finished, of edge trimming cutters located at the side of said support, a shaving device located on the frame beyond said trimming cutters, a shaft, means constantly connected with said shaft for operating the trimming cutters, a second shaft, means for connecting the second shaft with the first shaft and disconnecting it therefrom, and means connected with the second shaft for operating the shaving device.

19. In a machine for trimming stereotype printing plates, the combination of a saddle for receiving the plates, an arch in alinement therewith for receiving the plates from the saddle, a shaving blade in said arch, edge trimming cutters located between the saddle and arch, means for rotating said edge trimming cutters, and means connected with said rotating means and adapted to be disconnected therefrom for intermittently producing a relative motion of rotation between the blade and arch for shaving a plate in the arch.

20. In a stereotype plate finishing machine, the combination of a runway, a trimming cutter located adjacent thereto for trimming plates as they pass along the runway, means for continuously operating said cutter, a shaver located in the path of the plates on the runway, means connected with the means for operating the cutter for operating said shaver, and means for automatically stopping the shaver operating means without affecting the operation of said cutter.

21. In a stereotype plate finishing machine the combination of an arch, a clamp located on each side of the arch, means for positively forcing the clamp on one side toward the arch, and means for yieldingly forcing the clamp on the other side toward the arch.

22. In a stereotype plate finishing machine, the combination of an arch for receiving plates, a clamp on each side of said arch, means for positively forcing one of said clamps toward the arch, means for yieldingly forcing the other clamp toward the arch, and positive means for withdrawing the yielding clamp.

23. In a finishing machine, the combination of a frame having a cavity for receiving an article to be finished, a pair of clamps for forcing the article into the cavity, means for positively operating one of said clamps, and means for yieldingly operating the other clamp.

24. In a finishing machine, the combination of a frame having a cavity for receiving an article to be finished, a clamp, means for positively moving said clamp toward and from the cavity, a second clamp, yielding means for forcing the second clamp toward the cavity, and means for withdrawing the second clamp simultaneously with the withdrawal of the first clamp.

25. In a stereotype plate finishing machine, the combination of an arch, a pair of clamps located adjacent thereto, each clamp being provided with a plate holding roller, means for positively forcing one of said clamps toward the arch, means for yieldingly forcing the other clamp toward the arch, a shaver located within said arch, and means for starting said shaver into operation when the clamps have been moved into clamping position.

26. In a plate finishing machine, the combination of an arch for receiving plates, supports on the sides of the arch, rollers carried by said supports for supporting the edges of the plates, means for moving said supports toward the arch and means for simultaneously withdrawing both of them therefrom.

27. In a machine for finishing stereotype printing plates, the combination of a support, an arch in alinement therewith for receiving printing plates therefrom, means adjacent to said arch for stopping a printing plate in proper position therein, means for shaving a plate held in the arch, means for automatically stopping the shaving operation when completed, and means for automatically feeding a plate out of the shaving arch.

28. In a sterotype plate finishing machine, the combination of an arch, finishing means located therein, a cooling device, a feeding device in line with both the arch and cooling device and passing through the arch and into the cooling device for feeding the plates from the arch to the cooling device, and a movable stop within the cooling device for arresting the plates therein.

29. In a stereotype plate finishing machine, the combination of an arch, finishing means located therein, a cooling device, an inclined feeding device connecting the arch and cooling device for feeding the plates by gravity from the arch to the cooling device, a movable stop for arresting the motion of the plates in the cooling device, and means for moving said stop into operative position when a plate approaches the cooling device, said means being operated by contact with a stereotype plate.

30. In a stereotype plate finishing machine, the combination of a frame having an inclined bed, a series of anti-friction rollers mounted along said bed and adapted to support stereotype plates and feed them by gravity, a cutter mounted on said bed, a shaver located in the path of the plates through the bed, a cooler located in the path of the plates through the bed, and a receiving table located at the end of the bed and provided with rollers, said cutter, shaver, cooler and receiving table being in alinement.

31. In a stereotype plate finishing machine, the combination of a plate finishing device, a cooling device, means for transferring a plate from the finishing device to the cooling device, and means for introducing a plate into the finishing device at the same time, whereby one plate may be finished and another plate simultaneously cooled.

32. In a machine for finishing stereotype printing plates, the combination of a support, an arch in alinement therewith for receiving printing plates therefrom, means adjacent to said arch for stopping a printing plate in proper position therein, means for shaving a plate held in the arch, means for automatically stopping the shaving operation when completed, a cooling arch, and means for automatically feeding a plate out of the shaving arch and into the cooling arch.

33. In a stereotype plate finishing machine, the combination of a guide-way along which a stereotype printing plate can run, a cooling mechanism, a shaving mechanism whereby the plate will be clamped and shaved on its concave surface, means for controlling the entrance of the plate into the cooling and shaving mechanism, means for controlling the exit of the plate from the cooling mechanism, and means for causing a dwell of the plate in the cooling mechanism.

34. In a stereotype plate finishing machine, the combination of a guide way along which a stereotype printing plate can run, saws or cutters for truing the edges of the plate as it passes along the guide way, a cooling mechanism, a shaving mechanism whereby the plate will be clamped and shaved on its concave surface, means for controlling the entrance of the plate into the cooling and shaving mechanism, means for controlling the exit of the plate from the cooling mechanism, and means for causing a dwell of the plate in the cooling mechanism.

35. In a machine for finishing cast plate, the combination of a feed for the plates having means at each side for supporting one edge of the plates, a finishing mechanism, a shaft for operating the finishing mechanism, a guard above the shaft between said means, for guiding the cast plates into proper position, a cam on said shaft, and a stopping device for the plates operable by said cam and located above said guard along the feed.

36. In a plate finishing machine, the combination of a holder, a shaft, an end finishing cutter on said shaft, a shaver on said shaft, a stop for the plates located in the path of said finishing cutter, means for clamping a plate to the holder, and means for moving the stop out of the path of the end finishing cutter and returning it thereto.

In testimony whereof I have hereunto set my hand, in the presence of two subscribing witnesses.

H. A. WISE WOOD.

Witnesses:
 ANNIE B. WALTERS,
 MARY E. MCCADDEN.